(12) United States Patent
Cederlof

(10) Patent No.: US 9,723,293 B1
(45) Date of Patent: Aug. 1, 2017

(54) IDENTIFYING PROJECTION SURFACES IN AUGMENTED REALITY ENVIRONMENTS

(75) Inventor: Colter E. Cederlof, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 561 days.

(21) Appl. No.: 13/165,543

(22) Filed: Jun. 21, 2011

(51) Int. Cl.
*H04N 13/02* (2006.01)

(52) U.S. Cl.
CPC ............................... *H04N 13/0239* (2013.01)

(58) Field of Classification Search
CPC .. H04N 9/28; H04N 9/31; H04N 5/74; H04N 9/3197; H04N 9/3185; H04N 9/3129; H04N 9/3141; H04N 9/3105; H04N 5/64; H04N 5/2256; H04N 3/23; H04N 5/57; G03B 21/00; G09F 15/0087; G09G 3/002; H02B 15/04; G01S 17/023; G01S 17/36; G01S 17/89; A63B 2243/0045; G06F 3/033
USPC .... 348/602, 744, 207.99, E09.025, E05.119, 348/E05.024, 745, 840, 115, 143, 136, 348/139, 140, 142, 129; 345/673, 173; 353/119, 52, 28; 715/730
See application file for complete search history.

(56) References Cited

U.S. PATENT DOCUMENTS

| | | | |
|---|---|---|---|
| 7,125,122 B2 * | 10/2006 | Li et al. ........................ | 353/31 |
| 7,134,080 B2 * | 11/2006 | Kjeldsen et al. ............. | 715/730 |
| 7,364,306 B2 | 4/2008 | Margulis | |
| 7,384,158 B2 | 6/2008 | Ramachandran et al. | |
| 7,530,019 B2 * | 5/2009 | Kjeldsen et al. ............. | 715/730 |
| 8,118,434 B2 | 2/2012 | Turner et al. | |
| 8,142,029 B2 | 3/2012 | Matsumoto et al. | |
| 8,172,407 B2 | 5/2012 | Lim | |
| 8,269,902 B2 | 9/2012 | Plut | |
| 8,282,222 B2 | 10/2012 | Smits | |
| 8,356,254 B2 * | 1/2013 | Dennard et al. ............. | 715/764 |
| 8,589,796 B2 * | 11/2013 | Moesgaard Kjeldsen et al. ............................ | 715/730 |
| 2003/0128337 A1 * | 7/2003 | Jaynes et al. ................. | 353/30 |
| 2003/0165048 A1 * | 9/2003 | Bamji et al. ................. | 361/681 |

(Continued)

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — Dramos I Kalapodas
(74) *Attorney, Agent, or Firm* — Lee & Hayes, PLLC

(57) ABSTRACT

Techniques for identifying usable projection areas within an environment and projecting content onto these areas are described herein. The systems described herein may include one or more projectors, one or more cameras, and one or more computing devices. In some instances, the described techniques may utilize the one or more cameras to identify a flat projection surface. After identifying this surface, the techniques may use depth detection, edge detection, or other techniques to determine whether the surface includes any objects protruding there from. If so, then the techniques may identify the size and location of these objects and may store an indication that these objects occlude a portion of the flat projection surface and, therefore, that the locations associated with these objects are not usable projection areas. The techniques may then deduct the locations of the objects from the initially identified projection surface to determine the usable projection areas.

14 Claims, 13 Drawing Sheets

(56) References Cited

U.S. PATENT DOCUMENTS

| | | | |
|---|---|---|---|
| 2005/0128437 A1* | 6/2005 | Pingali et al. | 353/69 |
| 2005/0168705 A1* | 8/2005 | Li et al. | 353/69 |
| 2009/0168027 A1* | 7/2009 | Dunn et al. | 353/28 |
| 2009/0322498 A1* | 12/2009 | Yun et al. | 340/407.2 |
| 2010/0026818 A1* | 2/2010 | Yang et al. | 348/207.99 |
| 2010/0194872 A1* | 8/2010 | Mathe et al. | 348/77 |
| 2010/0309390 A1 | 12/2010 | Plut | |
| 2011/0080361 A1* | 4/2011 | Miller et al. | 345/173 |
| 2011/0234481 A1* | 9/2011 | Katz et al. | 345/156 |
| 2011/0279479 A1 | 11/2011 | Rodriguez | |
| 2012/0075534 A1* | 3/2012 | Katz et al. | 348/602 |
| 2012/0105473 A1 | 5/2012 | Bar-Zeev et al. | |
| 2012/0113140 A1* | 5/2012 | Hilliges et al. | 345/633 |
| 2012/0223885 A1* | 9/2012 | Perez | G06F 3/011 345/158 |
| 2012/0249416 A1* | 10/2012 | Maciocci et al. | 345/156 |
| 2012/0249741 A1* | 10/2012 | Maciocci et al. | 348/46 |
| 2012/0320157 A1* | 12/2012 | Junuzovic et al. | 348/46 |

OTHER PUBLICATIONS

Office action for U.S. Appl. No. 13/348,232, mailed on Jul. 1, 2013, Yao et al., "Projection Screen Qualification and Selection", 13 pages.

Office Action for U.S. Appl. No. 13/348,232, mailed on Dec. 23, 2013, Ning Yao, "Projection Screen Qualification and Selection", 11 pages.

\* cited by examiner

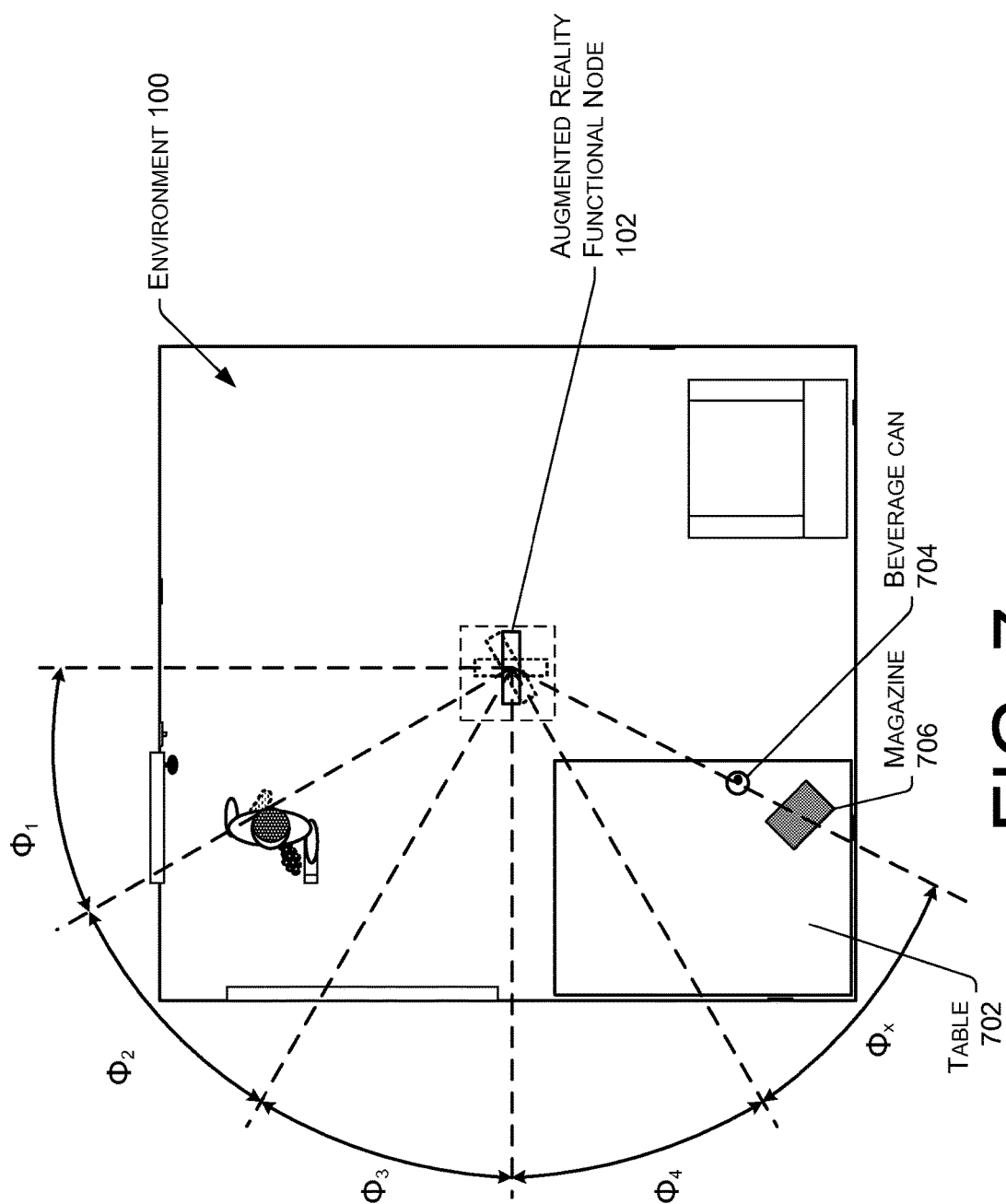
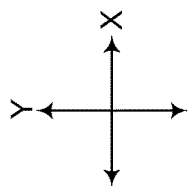
FIG. 7

IDENTIFYING PROJECTION SURFACES IN AUGMENTED REALITY ENVIRONMENTS

BACKGROUND

Augmented reality environments allow interaction among users and real-world objects and virtual or computer-generated objects and information. This merger between the real and virtual worlds paves the way for new interaction opportunities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 illustrates how the ARFN may, in some instances, scan an environment to identify suitable projection areas, such as the example area shown in FIG. 6.

DETAILED DESCRIPTION

Figure 1:
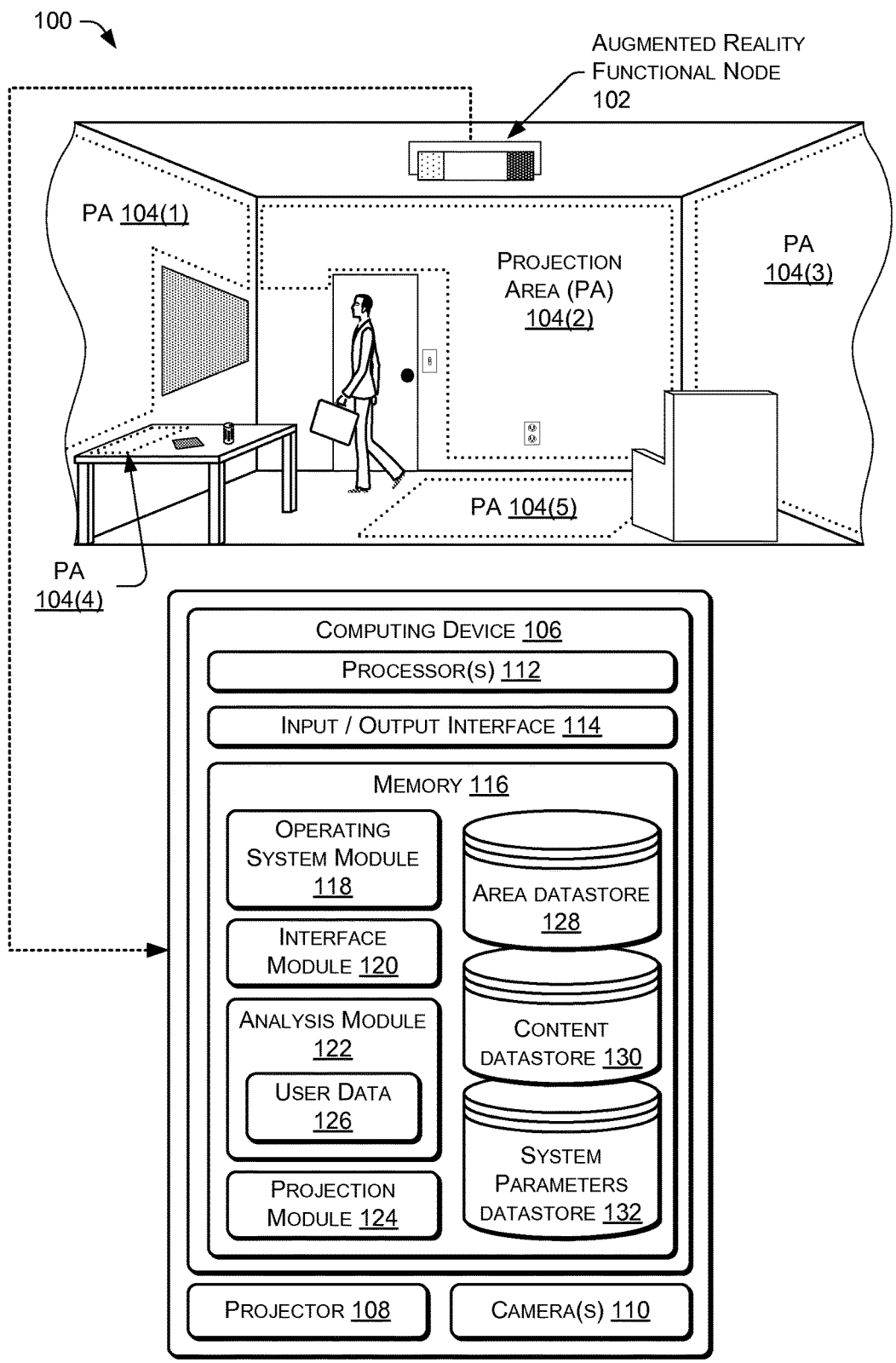
FIG. 1 illustrates an environment that includes an augmented reality functional node (ARFN). As illustrated, the ARFN has identified multiple areas within the environment that are suitable for projecting content such that a user within the environment can easily view and/or interact with the content.

This document describes, in part, techniques for identifying usable projection areas within an environment and projecting content onto the identified areas. The systems described herein may include one or more projectors, one or more cameras, and one or more computing devices. In some instances, the described techniques may utilize the one or more cameras to identify a flat projection surface, a curvilinear projection surface, or a projection surface of any other desired shape. After identifying this surface, the techniques may use depth detection, edge detection, or other techniques to determine whether the surface includes any objects protruding there from. If so, then the techniques may identify the size and location of these objects and may store an indication that these objects occlude a portion of the flat projection surface and, therefore, that the locations associated with these objects are not usable projection areas. The techniques may then deduct the locations of the objects from the initially identified projection surface to determine the usable projection areas.

After determining these usable projection areas, the techniques may project content onto one or more of these areas. For instance, if a user within the environment requests to view a particular piece of content, the techniques may project this content on a usable projection area. This content may comprise an electronic book, a video, an image, an interactive menu, and/or any other type of content.

To illustrate, envision that an example user within an environment wishes to view a particular image on a wall within the environment. To make this request, the user may perform a predefined gesture captured by a camera of the system, may issue a predefined voice command captured by a microphone of the system, or may otherwise request to view the image in any other way. In response, the system may identify a portion of the wall that is not occluded by objects, such as picture frames or the like. Thereafter, the system may project the image on an exposed portion of the wall, such that the image does not appear directly over a picture frame or any other object. By identifying and utilizing the usable projection area in this manner, the user viewing the image is able to view the image much more clearly than if the system were to indiscriminately project the content over the picture frame or on any other object protruding from the flat surface.

In some instances, the system may identify usable projection areas within an environment prior to receiving a request to project content within the environment. As such, the system may pre-identify these usable projection areas in whole or in part, such that the system is ready to project content onto a usable area in response to receiving a request to do so. In other instances, meanwhile, the system may refrain from identifying the useable projection area in whole or in part until after receiving a request to project content.

In either of these instances, the system may identify the flat projection surface and/or the protruding objects with use of depth detection and/or edge detection techniques. For instance, the system may include a three-dimensional, infrared camera or other depth-sensing technology (e.g., stereoscopic imaging) to detect varying depths of objects within an environment. In addition or in the alternative, the system may utilize a red-green-blue (RGB) camera or other edge-detection technology to identify a predominant color of a flat projection surface, as well as color changes that are greater than a predefined color-change threshold. In some instances, identifying a color differential that is greater than the threshold is effective to identify edges of objects protruding from the flat projection surface. Therefore, by utilizing both depth-sensing and edge-detection technology, the systems described below are able to identify flat surfaces and objects protruding from the flat surfaces. As such, these systems are able to identify and utilize usable projection areas that are not occluded by the protruding objects. In addition, if an object is moved into an area within an environment in which these systems are currently projecting, then the systems may move or otherwise alter (e.g., shrink in size) the projection. For instance, if a system is currently projecting content onto a table and a beverage can is thereafter set in the middle of the projection on the table, then the system may move the projection to another, exposed area of the table.

In addition to identifying and utilizing usable projection areas as described above, the techniques described herein may customize the projection of the content. For instance, in response to a particular user requesting to view the image in the example above, the system may identify the user, determine one or more attributes associated with the identified user, and may project the content based at least in part on the one or more attributes. For instance, the system may identify a height of the user and, therefore, may project the content at an appropriate location on the wall. For instance, the system may project content at a higher location on the wall for a taller user and at a lower location on the wall for a shorter user (e.g., a young child).

Additionally or alternatively, the attribute of the user may comprise a location of the user within the environment, a current line of sight of the user, a preference of the user, an age of the user, or any other attribute. For instance, the system may determine that the user issuing the request resides within a particular corner of the environment and, in response, the system may project the content onto a usable projection area that is nearer this particular corner. Similarly, the system may determine a current line of sight of the user to determine whether any objects occlude the user's view of an otherwise usable projection area. If so, the system may alter a location at which the system projects the content so as to enable the user to view the content given the user's current line of site. Additionally or alternatively, preferences of the user may indicate that the system should project the content with a particular size, font, style, format, or the like. Of course, while a few examples have been given, it is to be appreciated that the system may take into account any other number of user attributes.

In addition to taking into account attributes of the user when projecting the content, the system may take into account attributes of the content. These attributes may include a size of the content, a source of the content, an object within the environment that relates to the piece of content, or the like. For instance, a piece of content may specify that is should be displayed on a minimum projection area of three feet by three feet. As such, the system may locate a projection area meeting those specifications that is nearest to the requesting user and may project the content onto the located area. A source that provides the content (e.g., a particular website, content provider, etc.) may similarly instruct the system to project the content at a particular size, location, or the like.

In another example, the content may relate to a physical object within the room and, therefore, the system may project the content in a location that is based at least in part on the physical object. For instance, in one example the projected content may comprise content that is supplemental to a movie or television show that the user is viewing on a television within the environment. As such, the system may project this content adjacent to the television such that the user can easily view both the movie/show and the supplemental content.

The system may also take into account environmental conditions within the environment when identifying a usable projection area to project the content thereon. For instance, the one or more cameras of the system may identify walls, tables, or other projection surfaces within the environment that have a glare that is greater than predefined threshold, have ambient light conditions that are greater or less than a threshold, or the like. In response, the system may remove these areas from the list of usable projection areas and may proceed to project the content onto another projection surface within the environment.

After projecting the content onto a usable projection area as described above, the system may receive a request to move the projected content to another location within the environment. For instance, the user that initially requested the content or another user may issue a command (e.g., audibly, via a gesture, etc.) to move the content from a first location to a second location. In response, the system may identify a travel path from the first location to the second location. In some instances, this travel path is around any protruding objects, such that the system continues to project the content while moving along the path while avoiding projecting the content onto any protruding objects. Furthermore, in instances along the travel path where a projection area becomes smaller, the system may shrink the size of the projection, may cease projecting the content momentarily, or may otherwise graphically alter the presentation. When the content reaches a usable projection area along the travel path that is large enough to display fully the projected content, the system may resume the normal projection of the content along the path.

As described herein for illustration and not by way of limitation, the system may identify the projection surfaces and the objects by a combination of a structured light source, such as an image projector configured to generate structured light patterns, and one or more cameras to image those patterns. The projector and camera(s) may further be incorporated into a single unit and designated as an augmented reality functional node (ARFN). In other implementations, other combinations of elements such as projectors, cameras, microphones, ultrasound transducers, depth sensing cameras, weight sensors, touch sensors, tactile output devices, and so forth may be also be present within or coupled to the ARFN. For convenience, and not by way of limitation, some of the examples in this disclosure refer to the use of structured light for the characterization of the physical environment of the scene including objects therein. However, in addition to or in place of structured light, other techniques may be used such as light detection and ranging (LIDAR), optical time-of-flight, ultrasonic ranging, stereoscopic imaging, radar, and so forth either alone or in combination with one another.

Example Environment and Process

FIG. 1 shows an illustrative augmented reality environment 100 that includes an augmented reality functional node (ARFN) 102 that may be configured to perform the techniques described above. While the environment illustrates a single node, in some instances an environment may include multiple different nodes stationed in different locations throughout the environment. When active, the ARFN 102 may project content onto any surface within the environment 100, thereby generating an augmented reality environment that may incorporate real-world objects within the environment 100. The projected content may include electronic books, videos, images, interactive menus, or any other sort of visual content.

For instance, the user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a virtual remote control to operate the television illustrated within the environment 100. As discussed below, the ARFN 102 may include one or more cameras that may capture images of the illustrated user operating the remote control and, in response, the ARFN 102 may operate the television according to the interactions between the user and the projected control. While a few examples have been given, it is to be appreciated that the ARFN 102 may project any other sort of content within the environment 100.

In order to project this content is a manner that is helpful to the users within the environment 100, the ARFN 102 may identify one or more usable projection areas 104(1), 104(2), . . . , 104(5) within the environment. In some instances, these usable projection areas 104(1)-(5) represent flat projection surfaces within the environment that are free from objects that protrude from the surface. Because these areas 104(1)-(5) are flat surfaces that are free from protruding objects, users within the environment 100 may be able to easily view and consume content projected thereon, as compared to viewing content that is projecting atop protruding objects, such as picture frames, televisions, and the like.

As illustrated, the first three illustrated usable projection areas (or "projection areas") 104(1)-(3) comprise portions of walls within the environment that are free from protruding objects. The first area 104(1), for instance, comprises the portion of the left-most wall excluding the television hanging from the wall. The second area 104(2), meanwhile, comprises the far wall of the environment, excluding the door and the light switch. The third area 104(3), meanwhile, includes nearly the entire right-most wall, which is free from any objects protruding there from.

In addition to the projection areas 104(1)-(3) on the walls of the environment 100, the ARFN 102 may identify usable projection areas on tables within the environment 100, a floor of the environment 100, and/or other projection surfaces within the environment 100, which may be flat, curvilinear, or another shape. The projection area 104(4), for instance, illustrates that the ARFN 102 has identified the exposed portion of the table that is free from the objects residing thereon as a usable projection area within the environment. In addition, the ARFN 102 has identified the floor, less the area occluded by the illustrated table and chair, as a usable projection area 104(5).

With use of the usable projection areas 104(1)-(5), the ARFN 102 may project one or more different pieces of content in a manner that is easily viewable by users within the environment. That is, these projection areas 104(1)-(5) represent locations within the environment 100 onto which the ARFN 102 may project content without concern for whether one or more objects would make the viewing of this content by users difficult. While FIG. 1 indicates the usable projection areas 104(1)-(5) with dotted lines, it is to be appreciated that the ARFN 102 may or may not visibly mark (e.g., via projection) the areas 104(1)-(5) within the environment.

As illustrated, the ARFN 102 comprises a computing device 106, a projector 108, and one or more cameras 110. Some or the entire computing device 106 may reside within a housing of the ARFN 102 or may reside at another location that is operatively connected to the ARFN 102. The computing device 106 comprises one or more processor 112, an input/output interface 114, and memory 116. The processors 112 may be configured to execute instructions, which may be stored in the memory 116 or in other memory accessible to the processors 112.

The input/output interface 114, meanwhile, may be configured to couple the computing device 106 to other components of the ARFN 102, such as the projector 108, the cameras 110, microphones, other ARFNs 102, other computing devices, and so forth. The coupling between the computing device 106 and the devices may be via wire, fiber optic cable, wireless connection, or the like.

The memory 116, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 106. The memory 116 may reside within a housing of the ARFN, on one or more storage devices accessible on a local network, on cloud storage accessible via a wide area network, or in any other accessible location.

The memory 116 may store several modules, such as instructions, datastores, and so forth that are configured to execute on the processors 112. For instance, the memory 116 may store an operating system module 118, an interface module 120, an analysis module 122, and a projection module 124.

The operating system module 118 may be configured to manage hardware and services within and coupled to the computing device 106 for the benefit of other modules. The interface module 120, meanwhile, may be configured to receive and interpret commands received from users within the environment 100. For instance, the interface module 120 may analyze and parse images captured by the one or more cameras 110 to identify gestures made by users within the environment 100. In response to identifying a predefined gesture, the interface module 120 may interpret the gesture and cause the ARFN to perform a corresponding action. For instance, if a user within the environment 100 makes a gesture requesting that the ARFN project a certain piece of content, then the interface module 120 may interpret the gesture and cause the projection module 124 to project the content via the projector 108. In other instances, the interface module 120 identifies commands audibly issued by users within the environment and captured by one or more microphones of the ARFN 102. In still other instances, the interface module 120 allows users to interface and interact with the ARFN 102 in any way, such as via physical controls, and the like.

The analysis module 122, meanwhile, functions to analyze the environment 100 based on images captured by the cameras 110 for the purpose of identifying the projection areas 104(1)-(5). For instance, the analysis module 122 may calculate depths of varying objects within the environment 100 based on information captured by a three-dimensional, infrared camera. With use of these calculated depths, the module 122 may determine flat projection surfaces within the environment 100, as well as objects protruding from these surfaces. Additionally or alternatively, the analysis module 122 may identify edges of objects within the environment 100 based on color information captured by a red-green-blue (RGB) camera. With use of one or both of the detected depths and edges, the analysis module 122 may identify flat projection surfaces, protruding objects, and the usable projection areas 104(1)-(5) comprising the projection surfaces less the portions of these surfaces occluded by the objects.

In some instances, the analysis module 122 may tailor these usable projection regions based on a particular user or users within the environment 100. For instance, the module 122 may reference user data 126 to both identify users within the environment 100 and to identify preferences and/or other attributes of these identified users. For instance, the module 122 may utilize facial recognition techniques, voice recognition techniques, or any other suitable technology to identify a particular user within the environment. The module 122 may then tailor the projection areas 104(1)-(5) to the identified user.

For instance, envision that the ARFN 102 receives a command from a user within the environment 100 to display a particular piece of content. In response, the analysis module 122 may identify the user with reference to the user data 126, and may thereafter determine a height of the user from the user data 126. After doing so, the analysis module 122 may then tailor the usable projection areas 104(1)-(5) based on the determined height of the user. For instance, if the user is determined to be relatively tall, then the module 122 may indicate that the content should be projected on the upper regions of the of projection areas 104(1)-(5). Conversely, if the user is determined to be shorter, then the module 122 may instruct the projector to project the content on a lower region of the projection areas 104(1)-(5).

After identifying, and potentially tailoring, the usable projection areas 104(1)-(5), the analysis module 122 may provide this information to the projection module 124. The projection module 124 may then obtain the content that is to be projected, and may pass this content to the projector 108 along with an indication of where the content is to be projected within the environment. In response, the projector 108 may project the content at the indicated location.

As illustrated, the memory 116 may further store an area datastore 128, a content datastore 130, and a system parameters datastore 132. The area datastore 128 is configured to maintain information about the usable projection areas 104(1)-(5) within the environment 100. That is, the area datastore 128 includes indications received from the analysis module 122 of those areas of the environment 100 that are available to be used as projection surfaces in the event that a user within the environment issues a request to the ARFN 102 to project content. In some instances, the analysis module 122 updates the area datastore 128 periodically, upon receiving a request to project content, or according to any other schedule.

The content datastore 130, meanwhile, stores (persistently or temporarily) content that is for projection by the projector 108 or for output by other output devices of the ARFN 102 (e.g., speakers, etc.). This content may include electronic books, songs, videos, images, or the like. The ARFN 102 (e.g., via the interface module 120) may obtain individual pieces of content in response to user requests or otherwise. For instance, the interface module 120 may obtain a particular movie from a content provider and may store the movie in the content datastore 130 in response to a corresponding request from a user within the environment 100.

Finally, the system parameters datastore 132 is configured to maintain information about the state of the computing device 106, the projector 108, the cameras 110, and so forth. For example, and as described in detail below, the ARFN 102 may be configured to pan and tilt for the purpose of allowing the projector 108 and the cameras 110 access the different projection areas 104(1)-(5) in the environment 100. As such, the system parameters maintained in the datastore 132 may include current pan and tilt settings of the camera(s) and projector(s), content that the ARFN 102 is currently projecting or otherwise outputting, and the like.

Figure 2:
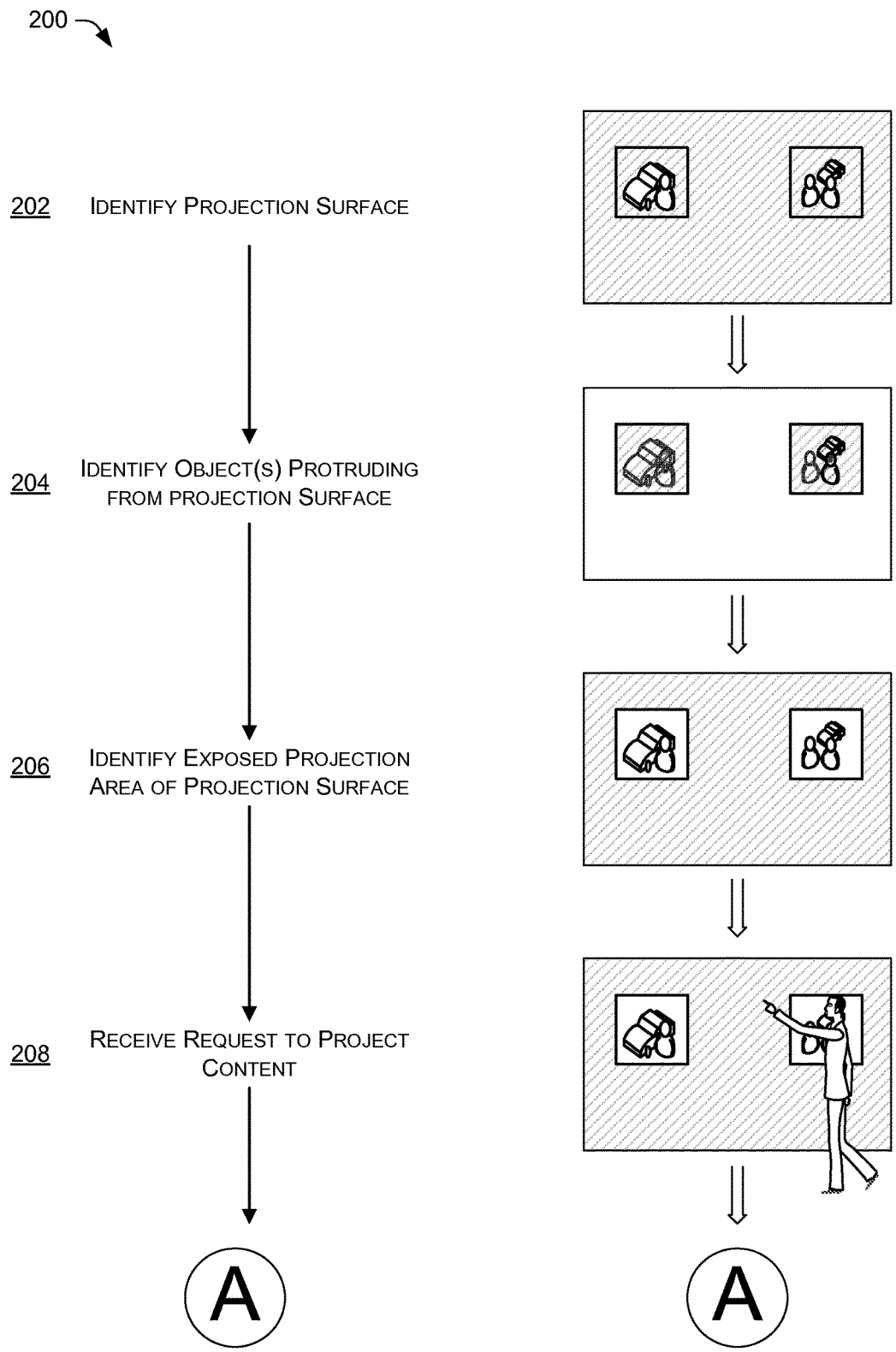
FIGS. 2-3 illustrate an example process for identifying a projection area that is tailored to a user requesting to view a particular piece of content and projecting the content for consumption by the user.
Figure 3:
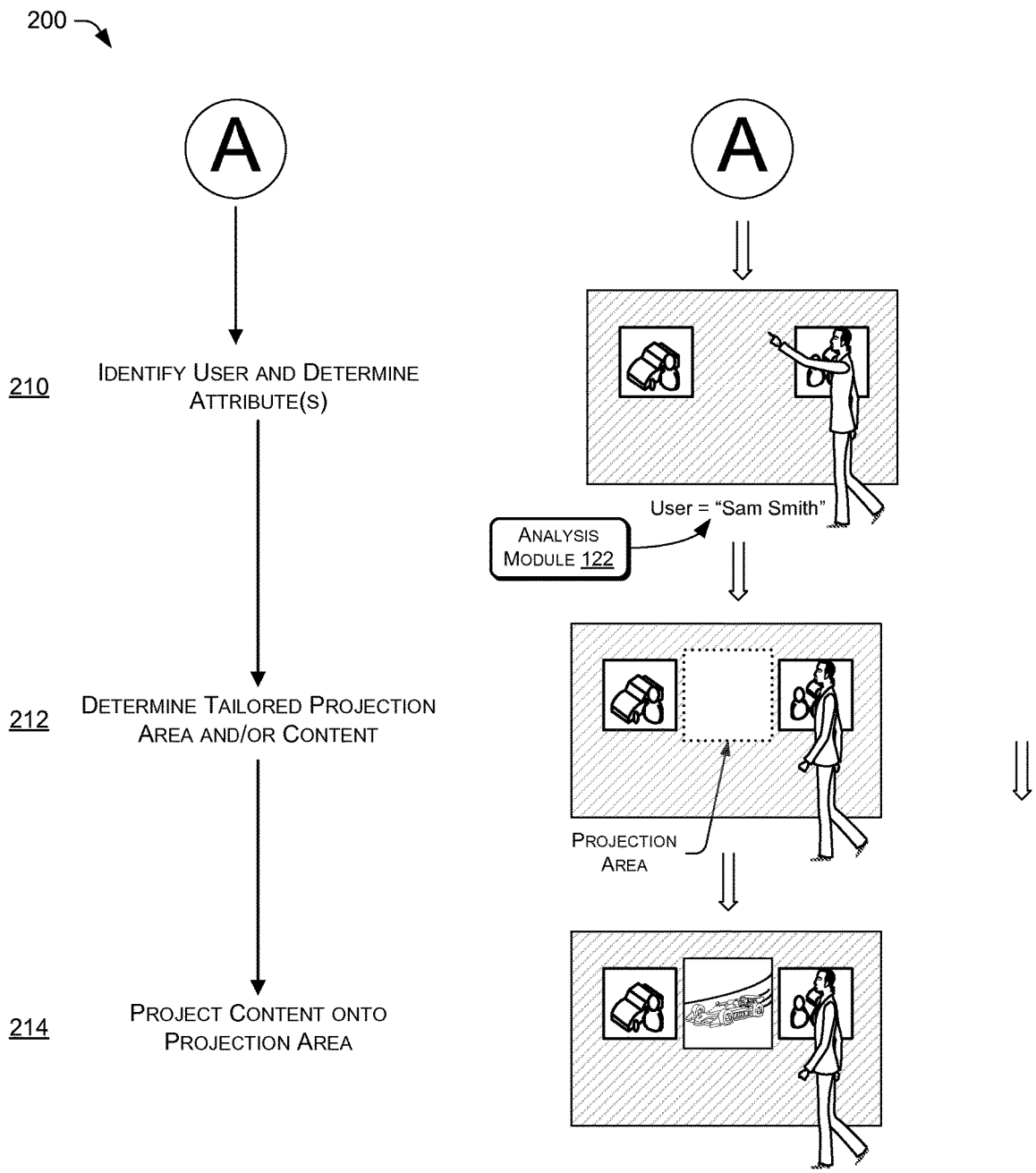

FIGS. 2-3 illustrate an example process 200 for identifying a projection area that is tailored to a user requesting to view a particular piece of content and projecting the content for consumption by the user. The process 200 may take place in the environment 100 or in a similar environment, and may be performed partially or entirely by the ARFN 102 described above.

At 202, the ARFN 102 may identify a projection surface. As illustrated, this projection surface may comprise a flat surface within the environment, such as a wall, floor, table, or the like. In some instances, the analysis module 122 may identify the projection surface with reference to depth and/or color information captured by the cameras 110. For instance, the analysis module 122 may identify the illustrated wall based on the fact that the wall is generally flat and has a predominant background color that is consistent for a substantial portion of the surface.

At 204, the ARFN 102 may identify any objects protruding from the surface identified at 202. Here, the ARFN 102 has identified two protruding objects, which comprise pictures in the illustrated example. Again, the analysis module 122 may have identified these objects with reference to the depth and color information captured by the cameras 110, as described in further detail with reference to FIG. 6. For instance, the analysis module 122 may have identified the edges of the objects based on the change in color from the predominant color of the wall. Additionally or alternatively, the ARFN 102 may identify the objects by performing background subtraction (e.g., comparing an image of the wall prior to the pictures having been hung on the wall with an image of the wall after the hanging of the pictures). Furthermore, in some instances the acts 202-206 may occur after receiving a request from a user to project content. As such, the ARFN 102 may capture the latter image after receiving the request to project content.

Returning to the illustration, at 206 the ARFN 102 may identify an exposed projection area of the projection surface by deducting the determined locations of the protruding objects from the determined location of the projection surface identified at 202. In some instances, and as discussed below, the ARFN 102 may also deduct any portions of the projection surface that are occluded based a field of view of the projector of the ARFN and/or a line of sight of the user within the environment.

At 208, the ARFN 102 may receive a request to project content within the illustrated environment. In some instances, this request may be received via a gesture from a user, a voice command from a user, and/or in any other manner. For instance, the user may make a gesture comprising waving a hand, pointing at an object, arranging the user's fingers in a particular configuration, and so forth. Some gestures may also include audible elements, such as raising a hand and generating a finger snap, or rapping on a wall. However the user provides the request for content, the request may specify a particular area within the environment onto which to project the content (e.g., an exposed projection surface, an object within the environment, etc.), or the ARFN 102 may locate a source of the request (e.g., an area of the user within the environment).

FIG. 3 continues the illustration of the process 200. At 210, the ARFN 102 identifies the user issuing the request, along with one or more attributes associated with the user. For instance, the ARFN 102 may identify a height of the user, projection preferences of the user, or any other attribute.

At 212, the ARFN 102 determines a tailored projection area and/or tailored content based on the determined attribute of the user. For instance, the ARFN 102 may tailor the projection area such that the content is projected at an eye-level height of the user. Additionally or alternatively, the ARFN 102 may determine that this particular user prefers a particular format or size of content. As such, the ARFN 102 may tailor the content and/or the projection of the content based on these preferences.

Finally, at 214, the ARFN 102 projects the content onto the presentation area. As illustrated, the ARFN 102 projects the content in between the two pictures hanging on the wall. In some instances, the ARFN 102 may take into account the size, location, and orientation of the protruding objects when selecting where to project the content. Here, for instance, the ARFN 102 may center the projection left-to-right between the two pictures. If the object had a circular cross-sectional shape, meanwhile, the ARFN 102 may shift the projection radially away from the center of the object. In any event, by identifying the exposed portion of the wall as a usable projection area, the ARFN 102 ensures that the user is able to view the projected content free from any protruding objects disturbing or otherwise altering the projection. That is, because the ARFN 102 projects the illustrated content between the two pictures on the wall, as opposed to atop one or more of these pictures, the user within the environment is able to better view the projected content.

In instances where the user specifies a particular object onto which to the project the content, meanwhile, the ARFN 102 may identify the specified object with reference to the user's gesture (e.g., visual, audible, etc.) and with reference to the detected depths and/or edges within the room. After identifying a particular object specified by the user (e.g., the example picture frame), the ARFN 102 may project the content onto that specified object.

Example ARFN

Figure 4:
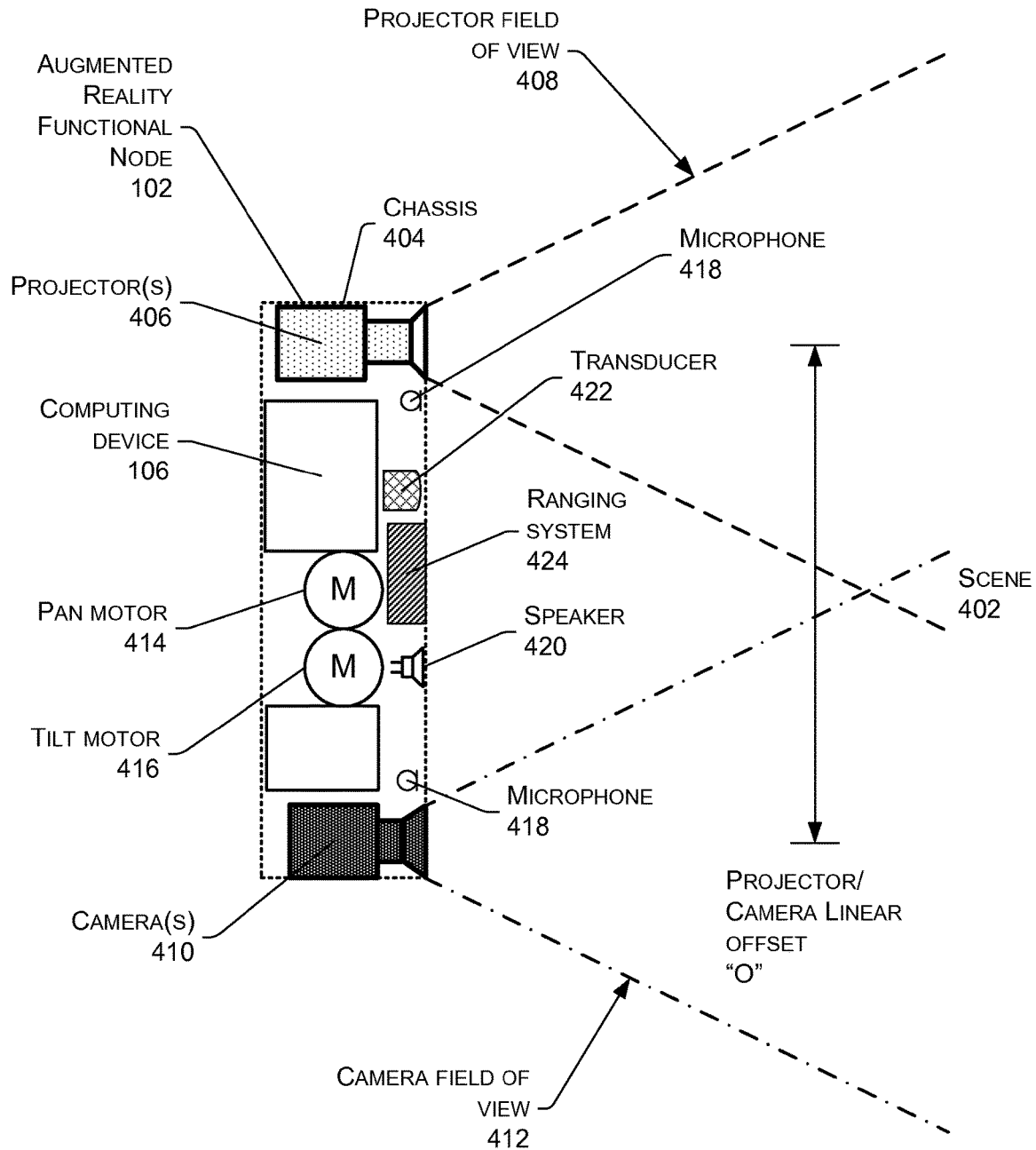
FIG. 4 illustrates an example augmented reality functional node that includes a computing device, a projector, a camera, and other selected components.

FIG. 4 shows additional details of an example ARFN 102 that may be configured to identify usable projection areas, as described above with reference to FIGS. 1-3. The ARFN 102 is configured to scan at least a portion of a scene 402 and the objects therein. The ARFN 102 may also be configured to provide augmented reality output, such as images, sounds, and so forth.

A chassis 404 holds the components of the ARFN 102. One or more projectors 406 may be disposed within the chassis 404 and may be configured to generate and project images into the scene 402. These images may be visible light images perceptible to the user, visible light images imperceptible to the user, images with non-visible light, or a combination thereof. This projector 406 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 406 has a projector field of view 408 which describes a particular solid angle. The projector field of view 408 may vary according to changes in the configuration of the projector. For example, the projector field of view 408 may narrow upon application of an optical zoom to the projector.

One or more cameras 410 may also be disposed within the chassis 204. The camera 410 is configured to image the scene in visible light wavelengths, non-visible light wavelengths, or both. The camera 410 has a camera field of view 412 that describes a particular solid angle. The camera field of view 412 may vary according to changes in the configuration of the camera 410. For example, an optical zoom of the camera may narrow the camera field of view 412.

In some implementations, a plurality of cameras 410 may be used. For instance, one embodiment of the ARFN 102 may include a camera that utilizes a structured light pattern (e.g., infrared light pattern, ultraviolet light pattern, visible light pattern, etc.) and a red-green-blue (RGB) or grayscale camera. The camera configured to project the structured light may be configured to capture information for detecting depths of objects within the scene 402, while the RGB or grayscale camera may be configured to detect edges of objects by identifying changes in color within the scene 402. In some instances, a single camera may be configured to perform these functions using a variety of the same or different technologies.

The chassis 404 may be mounted with a fixed orientation, or may be coupled via an actuator to a fixture such that the chassis 404 may move. Actuators may include piezoelectric actuators, motors, linear actuators, and other devices configured to displace or move the chassis 404 or components therein such as the projector 406 and/or the camera 410. For example, in one implementation the actuator may comprise a pan motor 414, a tilt motor 416, and so forth. The pan motor 414 is configured to rotate the chassis 404 in a yawing motion. The tilt motor 416, meanwhile, is configured to change the pitch of the chassis 404. By panning and/or tilting the chassis 404, different views of the scene may be acquired. The analysis module 122 may use the different views to identify projection surfaces and objects within the environment.

One or more microphones 418 may be disposed within the chassis 404, or elsewhere within the scene 402. These microphones 418 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 420 may also be present to provide for audible output. For example, the speakers 420 may be used to provide output from a text-to-speech module or to playback pre-recorded audio.

A transducer 422 may be present within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 424. The ranging system 424 is configured to provide distance information from the ARFN 102 to a scanned object or set of objects. The ranging system 424 may comprise radar, light detection and ranging (LIDAR), ultrasonic ranging, stereoscopic ranging, and so forth. In some implementations the transducer 422, the microphones 418, the speaker 420, or a combination thereof may be configured to use echolocation or echo-ranging to determine distance and spatial characteristics.

In this illustration, the computing device 106 is shown within the chassis 404. However, in other implementations all or a portion of the computing device 106 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 406 and the camera 410. Placement of the projector 406 and the camera 410 at distance "O" from one another may aid in the recovery of structured light data from the scene. The known projector/camera linear offset "O" may also be used to calculate distances, dimensioning, and otherwise aid in the characterization of objects within the scene 402. In other implementations the relative angle and size of the projector field of view 408 and camera field of view 412 may vary. Also, the angle of the projector 406 and the camera 410 relative to the chassis 404 may vary.

In other implementations, the components of the ARFN 102 may be distributed in one or more locations within the environment 100. As mentioned above, microphones 418 and speakers 420 may be distributed throughout the scene. The projector 406 and the camera 410 may also be located in separate chassis 404. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 5:
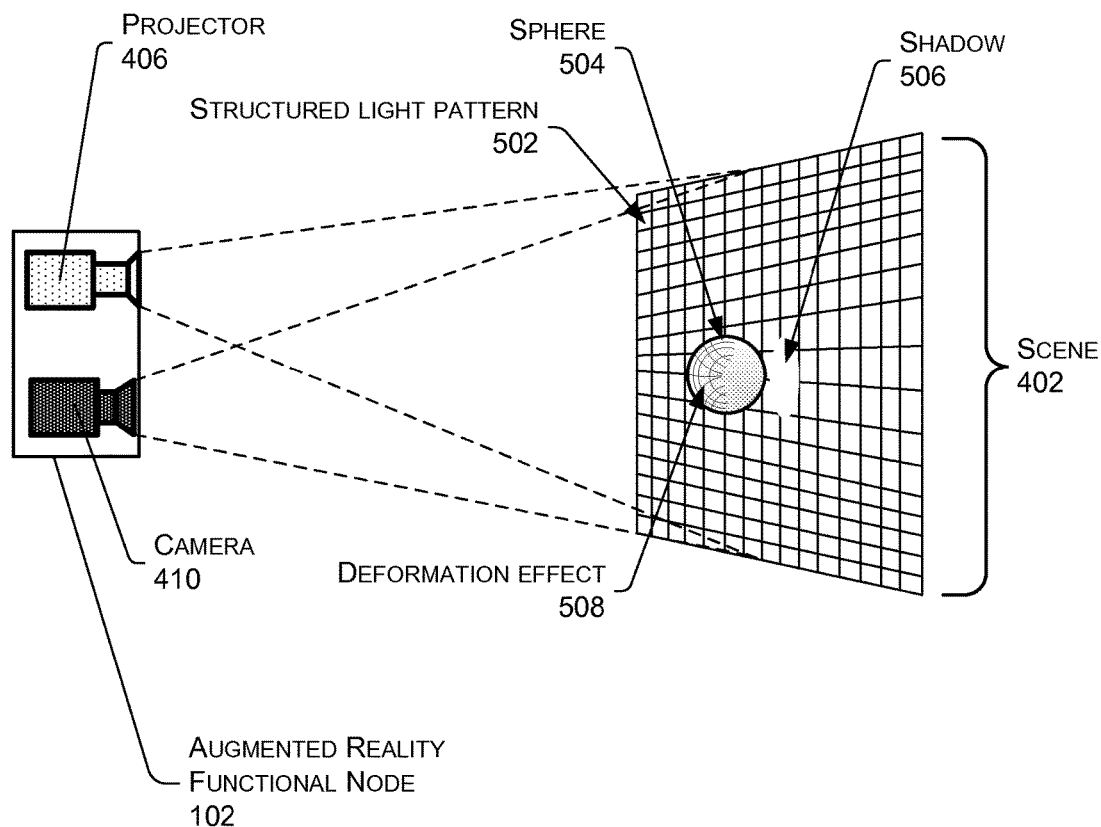
FIG. 5 is an illustrative diagram of the ARFN using structured light to identify surfaces and objects within an environment.

FIG. 5 is an illustrative diagram of the ARFN 102 using structured light to identify surfaces and objects within an environment. In some instances, the ARFN 102 may use structured light in this manner to identify depths and/or dimensions of objects within a particular scene 402. These techniques are described in detail in pending U.S. patent application Ser. No. 12/977,924, filed on Dec. 23, 2010 and entitled "Characterization of a Scene with Structured Light", which is incorporated in its entirety herein by reference. However, while the structured light techniques of FIG. 5 and the incorporated application provide one example for determining depths and/or dimensions of objects within a scene, it is to be appreciated that this information may be determined in any other manner in other embodiments.

In this instant illustration, the projector 406 projects a structured light pattern 502 onto the scene 402. In some implementations a sequence of different structured light patterns 502 may be used. In other implementations, other devices such as general room lighting may generate structured light patterns. A light fixture, bulb, and so forth may be configured such that emitted light contains one or more modulated structured light patterns 502. For example, two structured light patterns may be presented, each at a different non-visible wavelength within the structure of an incandescent bulb.

The cameras 410 used to detect the structured light may also be incorporated into bulbs or assemblies suitable for installation in existing light fixtures. These assemblies may be configured to communicate with the computing device 106 wirelessly or via transmission of a signal via the household electrical wiring. In some implementations, the assembly may provide pre-processing of input prior to sending data along to the computing device 106.

This structured light pattern 502 may be in wavelengths that are visible to the user, non-visible to the user, or a combination thereof. The structured light pattern 502 is shown in this example as a grid for ease of illustration and not as a limitation. In other implementations other patterns, such as bars, dots, pseudorandom noise, and so forth may be used. Pseudorandom noise (PN) patterns are useful as structured light patterns because a particular point within the PN pattern may be specifically identified. A PN function is deterministic in that given a specific set of variables, a particular output is defined. This deterministic behavior allows the specific identification and placement of a point or block of pixels within the PN pattern. In some implementations, a plurality of structured light patterns 502 may be used to image the scene. These may include different PN patterns, geometric shapes, and so forth.

For illustrative purposes, a sphere 504 is shown positioned between the projector 406 and a wall in the scene 402. A shadow 506 from the sphere 504 appears on the wall. Inspection of the sphere 504 shows a deformation or distortion effect 508 of the structured light pattern 502 as it interacts with the curved surface of the sphere 504.

In some implementations other effects, such as dispersion of the structured light pattern 502 may be used to provide information on the topology of the scene. Where the projector 406 and camera 110 have differing fields of view, such as shown in FIG. 4, the dispersion or change in the "density" of the structured light pattern 502 may be used to determine depth of field.

The camera 410 detects the interaction of the structured light pattern 502 with objects within the scene. For example, the deformation effect 508 on the sphere 504 is detected by the camera 410. The camera 410 is configured to sense or detect the structured light. In some implementations the camera 410 may also sense or detect wavelengths other than those used for structured light pattern 502. The image captured by the camera 410 is processed by the analysis module 122 to identify projection surfaces (e.g., represented by portions of the structured light that are not deformed) and protruding objects (e.g., represented by deformed portions of the structured light) within the scene 402. In some implementations, multiple cameras may be used to acquire the image.

The actual size of the sphere 504 in this example may not be readily determined based upon the geometry of the ARFN 102, diameter of the sphere 504, distance between the ARFN 102 and the sphere 504, and so forth. As a result, the analysis module 122 may be configured to make one or more assumptions about the scene, and test those assumptions to constrain the dimensions of the scene 402.

As mentioned above, the structured light pattern 502 may be projected using light which is visible to the user, non-visible to the user, or a combination of the two. Non-visible light offers the advantage of allowing the structured light pattern 502 to be projected onto the scene and remaining undetectable to the user. Non-visible light, however, may require special equipment or adaptations to the equipment to generate and modulate the non-visible light. For example, an image projector may incorporate a color wheel with segments configured to pass infrared light as well as visible light wavelengths.

Structured light patterns 502 may also be generated using wavelengths visible to the user. Visible wavelength structured light allows the use of existing image projection and image acquisition hardware. Visible wavelength structured light also allows for color characterization of objects. For example, primary color structured light patterns may be used to determine absorption and reflection of the primary color on objects within the scene. This color characterization may be utilized in some implementations to color correct for projection of an image onto a surface. For example, an image projected by the ARFN 102 onto a yellow writing pad may be color corrected to account for the yellow color of the pad.

While structured light patterns using visible light wavelengths are useful in characterizing the scene, they may be distracting or otherwise undesirable to users. Thus, generation and use of structured light patterns 502 which use visible light wavelengths yet are imperceptible may be beneficial.

Example Identification of Usable Projection Areas

Figure 6:
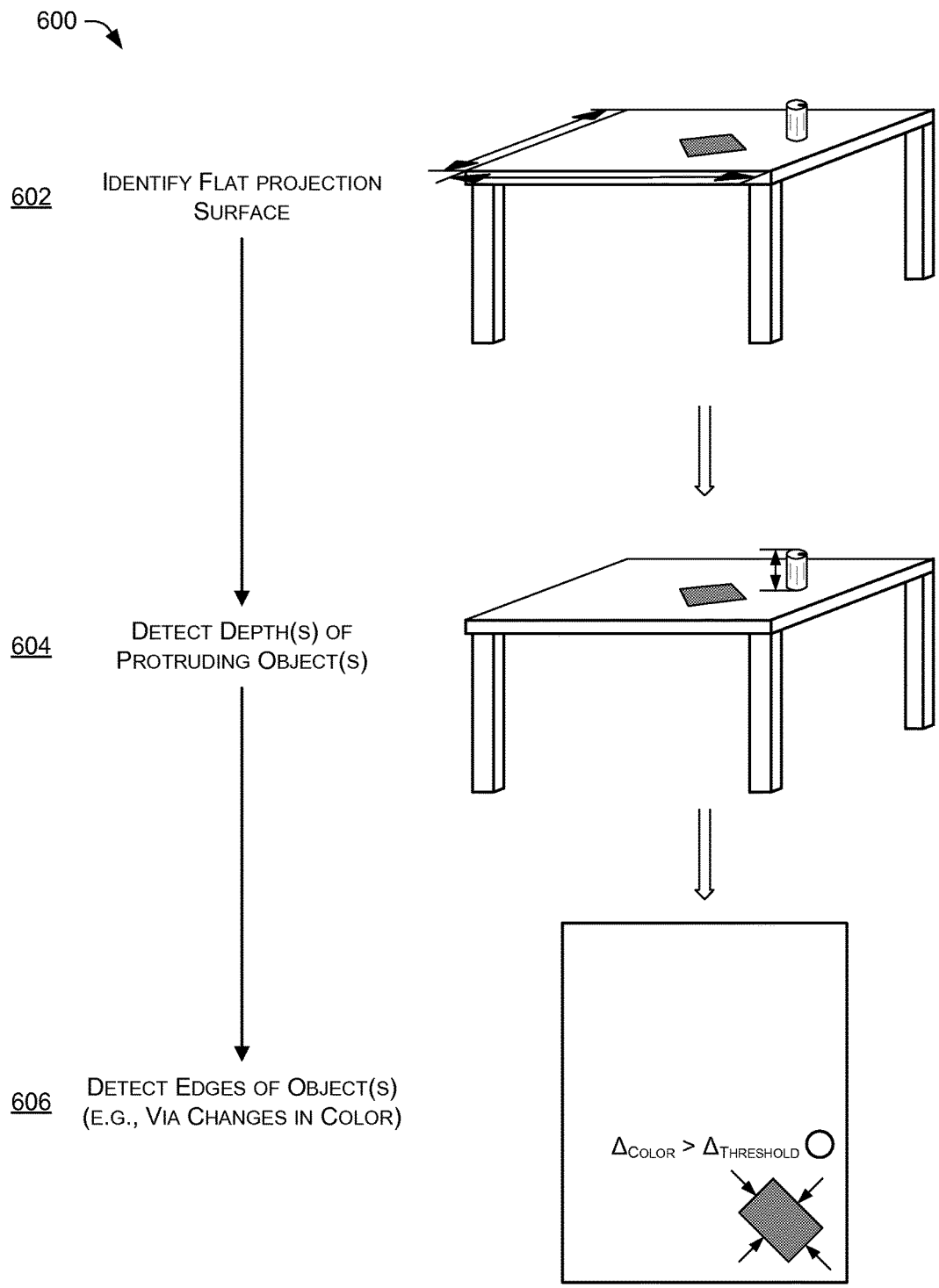
FIG. 6 illustrates an example process of identifying a suitable projection area by identifying a flat surface and then identifying objects protruding there from by detecting depths and edges of the protruding objects.

FIG. 6 illustrates an example process 600 of identifying a suitable projection area by identifying a flat surface and then identifying objects protruding there from by detecting depths and edges of the protruding objects. The ARFN 102 or other suitable systems may perform the process 600 with use of the edge-detection and depth-sensing techniques (e.g., structured light) described above, or with use of other suitable techniques.

At 602, the ARFN 102 identifies a flat projection surface. In the illustrated example, the surface comprises a table, although the surface may comprise a wall, a floor, or any other flat projection surface within an environment in other embodiments. In some instances, the ARFN 102 may identify the flat projection surface by determining that an object (here, the table) has a consistent depth above the floor for a certain length and width in the X and Y axes, respectively.

At 604, the ARFN 102 may detect depths of any objects protruding from the flat projection surface identified at 602. In this example, the table has a beverage can and a magazine residing on the table. As such, the ARFN 102 may identify at least the beverage can rising above the table. The ARFN 102 may store an indication of this protruding object in the area datastore 128, since this object occludes a portion of the identified flat projection surface. In some instances, the ARFN 102 may also identify that the magazine resides on the table with use of the ARFN's depth-sensing technology. In other instances, meanwhile, the ARFN 102 might not identify the magazine as a protruding object, given the relatively small difference in depth between the magazine and the underlying table.

At 606, however, the ARFN 102 may detect edges of the objects residing on the flat projection surface by, for instance, identifying changes in color, as illustrated by the top view of the table and the objects residing thereon. For instance, an RGB camera of the ARFN 102 may identify a predominant color of the flat projection surface as well as changes in color that are greater than a predetermined threshold. By doing so, the ARFN 102 may identify the magazine residing on the table in the illustrated example, as the color change associated with the magazine may be greater than the predefined threshold. By identifying the edges of the magazine, the ARFN 102 may store an indication of this object within the area datastore 128.

By identifying the table, the beverage can, and the magazine using depth-sensing and edge-detection technologies, the ARFN 102 is able to identify a usable projection area for projecting content. For instance, the ARFN 102 may deduct the areas associated with the beverage can and the magazine from the area associated with the table and may indicate that the resulting area is a usable projection area within the environment in which the table resides. For instance, the ARFN 102 may store this indication in the area datastore 128, such that the ARFN 102 may utilize this area in response to receiving a request to project content within the environment.

FIG. 7 illustrates how the ARFN 102 may, in some instances, scan an environment, such as the environment 100, to identify usable projection areas, such as the example area shown in FIG. 6. As illustrated, the ARFN 102 may rotate across several different angles, ϕ, to identify projection surfaces and objects residing thereon. After deducting areas associated with protruding objects from identified projection surfaces, the ARFN 102 may store an indication of these usable projection areas in the area datastore 128. While FIG. 7 illustrates several example angles across which the ARFN 102 may rotate across, it is to be appreciated that these angles are merely examples, and that other embodiments may implement more, fewer, and/or different angles.

In the illustrated example, the ARFN 102 may rotate across the environment 100 to identify the presence of the flat table 702, as well as the beverage can 704 and magazine 706 residing atop the table 702, as described above with reference to FIG. 6. The ARFN 102 may accordingly identify that a portion of the table 702 is available for use as a projection area in response to receiving a request to project content within the environment 100.

In some instances, however, the ARFN 102 may take additional factors into account when identifying usable projection areas within an environment. For instance, the ARFN 102 may take into account the field of view 408 of the projector 406 of the ARFN 102 and/or a line of sight of a user within the environment.

Figure 8:
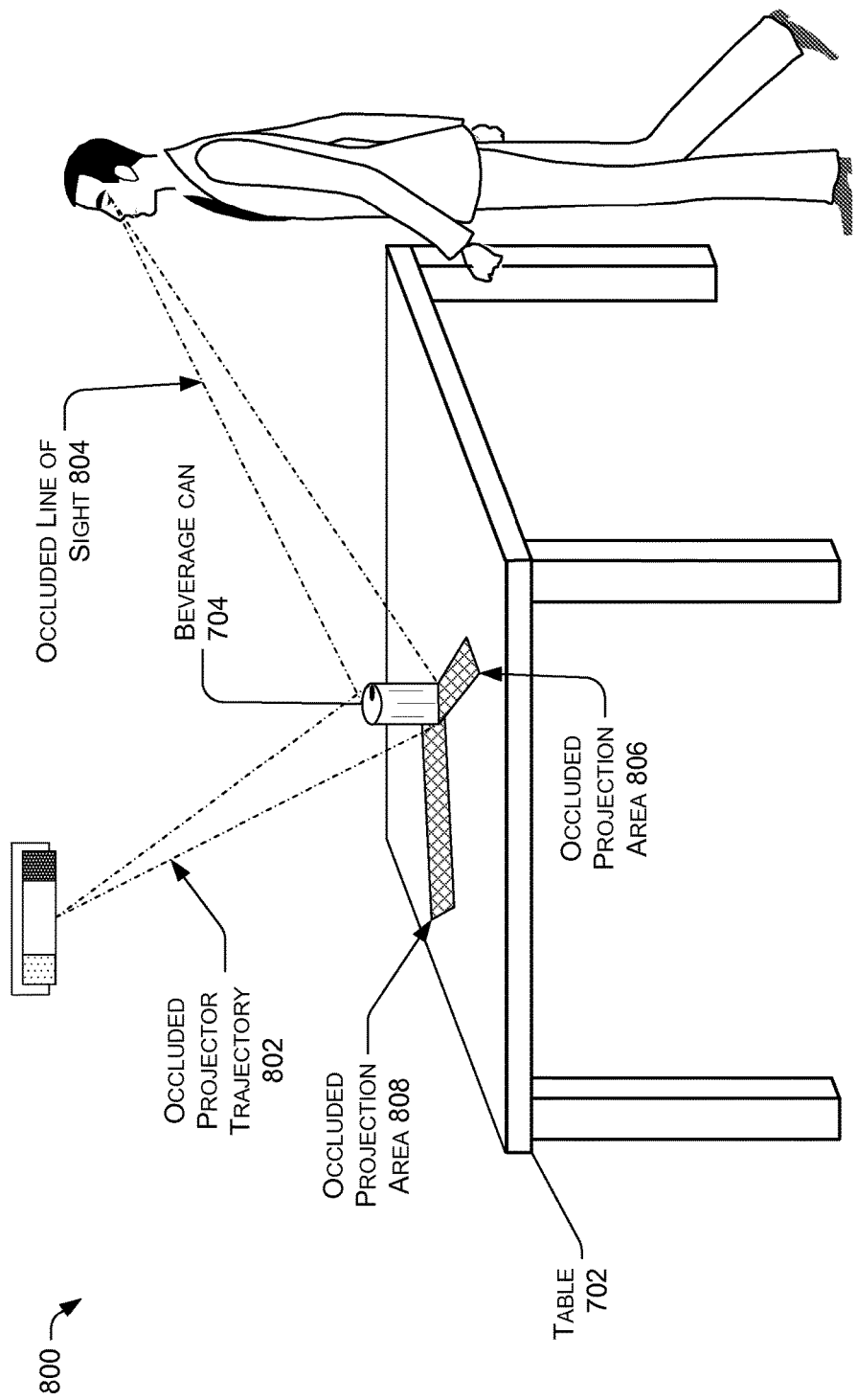
FIG. 8 illustrates how the ARFN may identify occluded projection areas on a surface with reference to a field of view of the projector of the ARFN and with reference to a line of sight of a user within the environment.

FIG. 8, for instance, illustrates how the ARFN 102 may identify occluded projection areas on a surface with reference to a field of view 408 of the projector 406 of the ARFN and with reference to a line of sight of a user within an environment 800. As illustrated, the environment 800 again includes the table 702 and the beverage can 704. The ARFN 102 may identify the table 702 as a projection surface and the beverage can 704 as an object protruding there from. Therefore, the ARFN 102 may deduct the area associated with the can 704 from the area associated with the table in determining the usable projection area of the table 702.

However, in identifying the usable projection area of the table 702, the ARFN 102 may also factor in a portion of the projector trajectory 802 that is occluded, as well as a portion of the line of sight 804 of the illustrated user that is occluded. The occluded projector trajectory 802 may comprise the trajectory at which the projector 406 is unable to reach the table 702 with a projection, due to the protrusion of the can 704 on the table 702. As such, the ARFN 102 may identify an occluded projection area 806 on the table 702, which represents a portion of the table 702 that the projector cannot reach due to the presence of the can 704 at the current location. Because the projection 406 cannot reach this location, the ARFN 102 may deduct the occluded projection area 806 from the usable projection area stored in the area datastore 128.

In addition, the occluded line of sight 804 of the user represents a trajectory of the user's line of sight that cannot reach the surface of the table 702 due to the presence of the can 704 at the current location. Therefore, the ARFN 102 may identify an occluded projection area 808 on the table 702, which represents a portion of the table 702 that the user cannot see from the user's current location. Because the user cannot see this location, the ARFN 102 may deduct the occluded projection area 808 from the usable projection area stored in the area datastore 128.

In other instances, meanwhile, the ARFN 102 may utilize rather than exclude the occluded projection area 808. For instance, if certain content was intended to be shielded from the sight of the user, then the ARFN 102 may project this content onto the occluded projection area 808. These techniques may be used, for instance, if two users within a same room were playing a game in which each user is to be shielded from content associated with the other user. In some instances, the ARFN 102 may store an indication of the location of these occluded projection areas (and the users to whom the area is occluded) in the area datastore 128.

In order to identify the user's line of the sight, the analysis module 122 may utilize facial recognition techniques to identify the location and orientation of a user's head and/or face within an environment. After identifying this location and orientation, the module 122 may identify a location and orientation of the user's eyes within the physical space of the environment 800, such as with reference to two-dimensional coordinates, three-dimensional coordinates (e.g., in X-Y-Z space, with reference to polar coordinates, etc.), or in any other manner. With this information, the module 122 may identify the line of sight of the user and, hence, may identify the occluded projection area 808.

Figure 9:
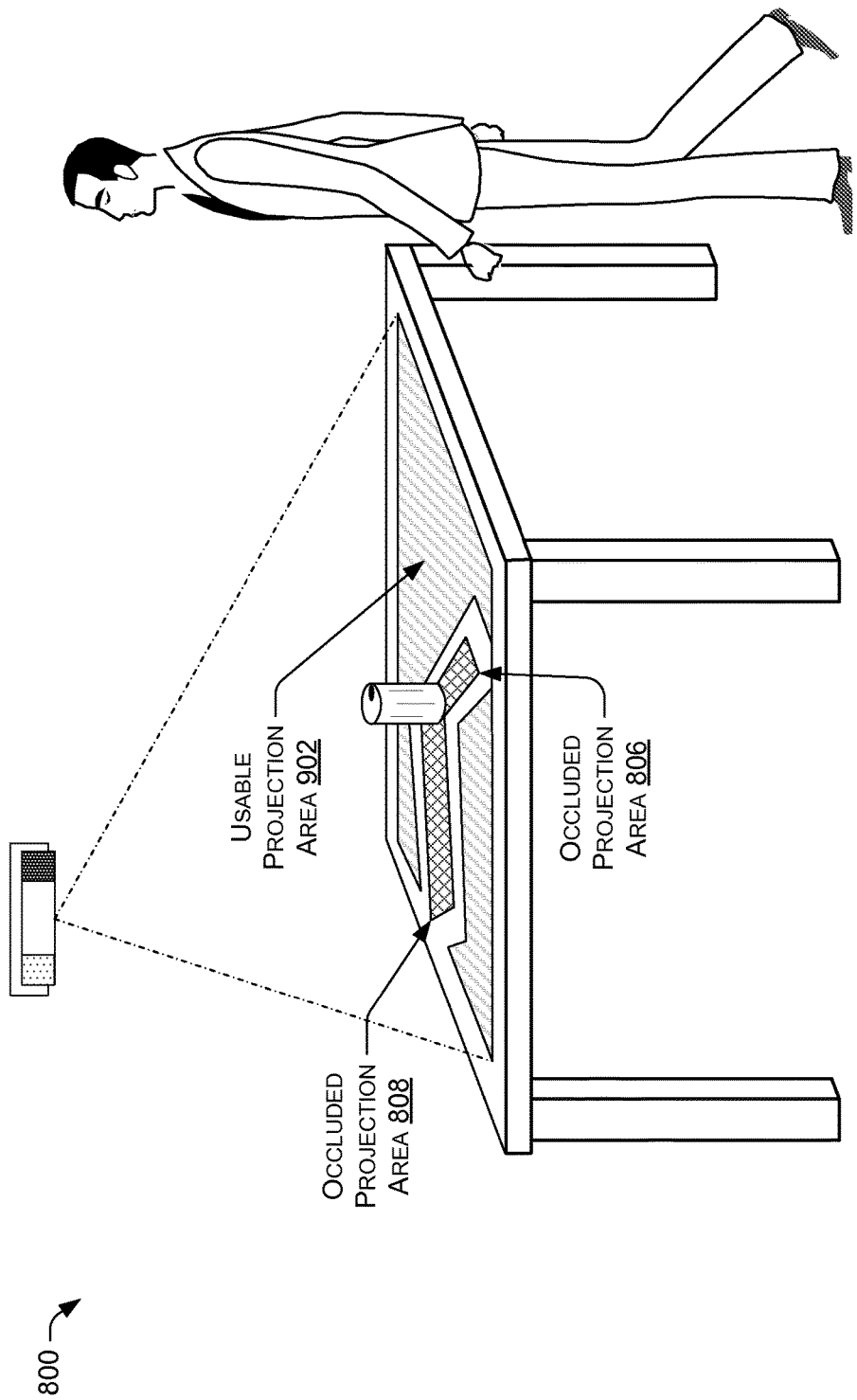
FIG. 9 illustrates the ARFN identifying a usable projection area within the environment of FIG. 8. As illustrated, the usable projection area excludes the occluded projection areas identified in FIG. 8.

FIG. 9 illustrates the ARFN 102 identifying a usable projection area 902 within the environment 800 of FIG. 8. As illustrated, the usable projection area 902 excludes the area of the table underneath the beverage can 704, as well as the occluded projection areas 806 and 808 identified in FIG. 8. The analysis module 122 of the ARFN 102, therefore, stores an indication of the usable projection area 902 in the area datastore 128. In some instances, the module 122 periodically identifies usable projection areas, while in other instances the module 122 may identify the usable projection area 902 (and/or other usable projection areas) in response to receiving a request from a user within the environment 800.

After identifying the usable projection area 902, the ARFN 102 may project one or more pieces of requested content onto this area 902, as described above. Furthermore, in addition to projecting this content, the ARFN 102 may identify a travel path between a location of the projected content and a future location of the projected content. For instance, if a user within the environment requests to move the projection of the content from one location to another, the ARFN 102 may identify a path from the first location to the other location. The ARFN 102 may simply cease projecting at the first location and resume projecting at the other location, or the ARFN 102 may actually project the content between the two locations along the identified travel path.

Figure 10:
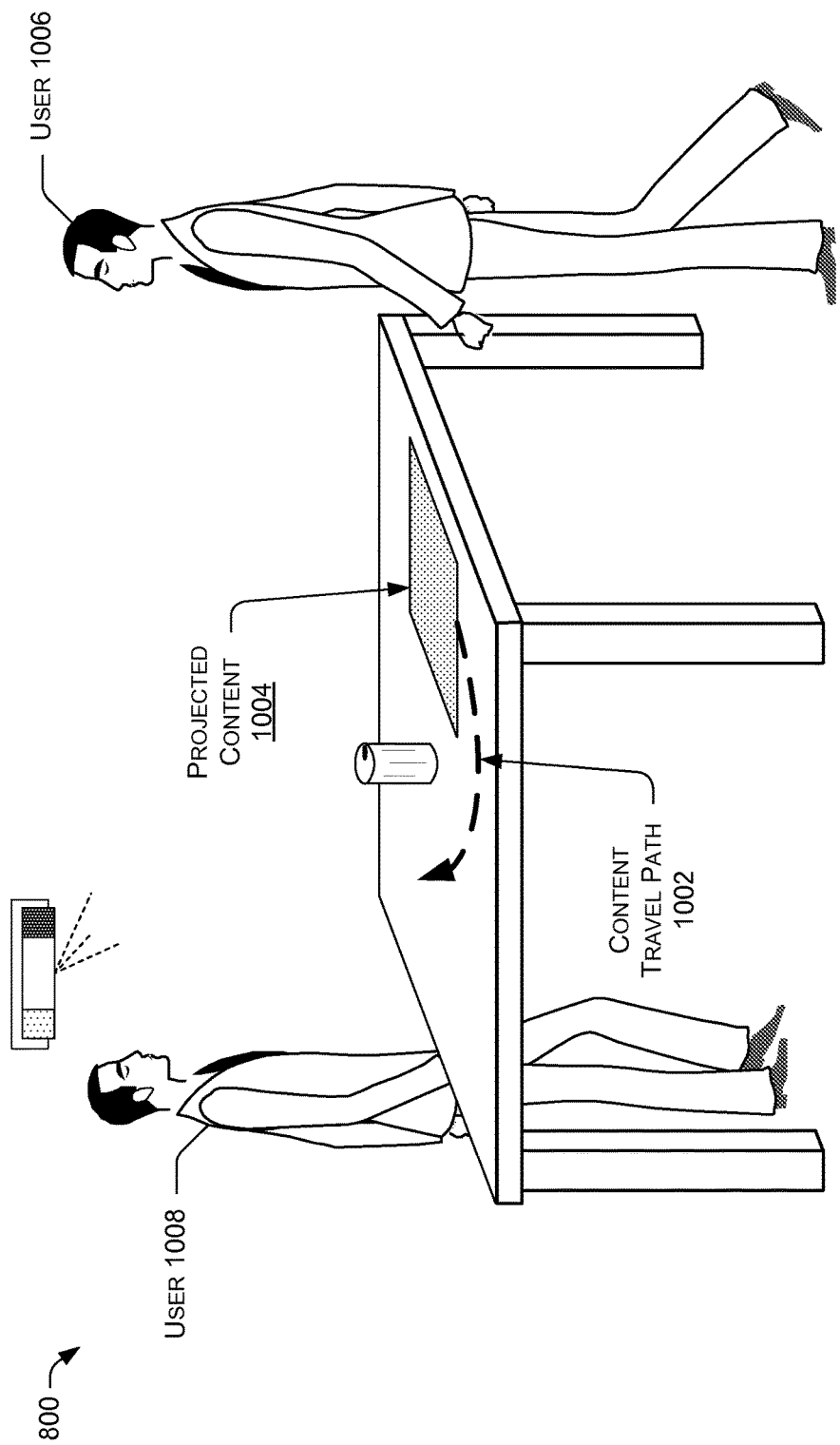
FIG. 10 illustrates the ARFN determining a travel path for a piece of projected content.

FIG. 10 illustrates the ARFN 102 determining a travel path 1002 for a piece of projected content 1004 within the environment 800. As illustrated, a first user 1006 within the environment may request to view the projected content 1004. As such, the ARFN 102 may project this content 1004 on the table nearer the user 1006. Thereafter, the user 1006 or another user 1008 may request to move the content nearer to the user 1008. In response to this request, or in anticipation of this request, the ARFN 102 may identify a travel path 1002 from the first user 1006 to the second user 1008. In some instances, this travel path may avoid protruding objects on the projection surface. That is, the ARFN 102 may project the content along the path 1002 such that the content remains projected on the usable projection area and generally away from any protruding objects, such as the beverage can 704.

Figure 11:
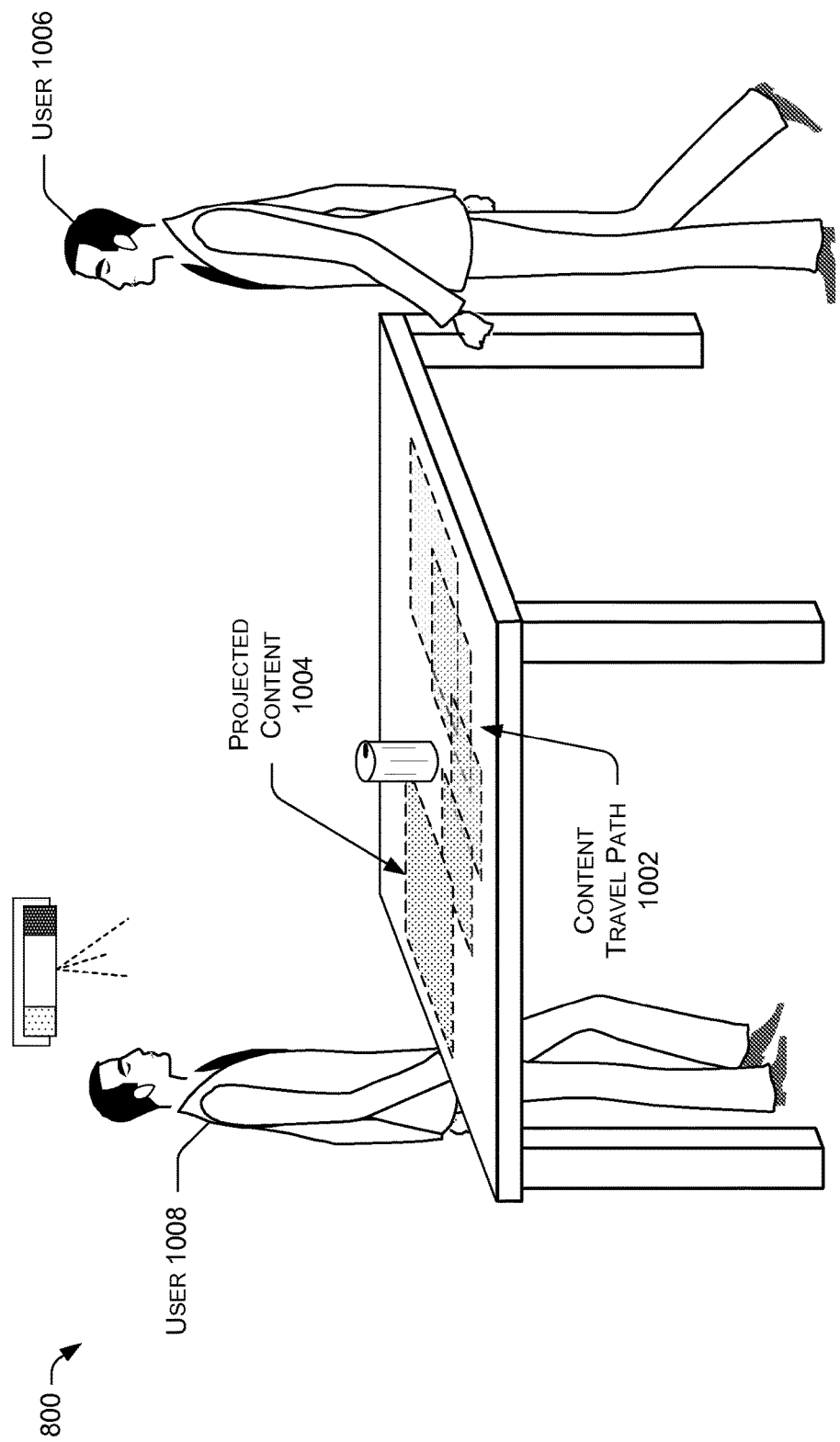
FIG. 11 illustrates the ARFN projecting the content along the travel path of FIG. 10. As illustrated, the projected content travels around the protruding object and also becomes smaller during the travel in order to fit between the object and the edge of the table.

FIG. 11 illustrates the ARFN 102 accordingly projecting the content 1004 along the travel path 1002 of FIG. 10. As illustrated, the projected content travels around the protruding beverage can. In addition, the ARFN 102 may alter a size of the projected content 1004 along the path 1002. Here, for instance, the ARFN 102 lessens a size of the projected content 1004 during the travel in order to allow the content 1004 to fit between the object and the edge of the table. The ARFN 102 may similarly alter a size of the content if the travel path 1002 directed the content 1004 between two objects on the table 702, such as between the beverage can 704 and a magazine or other object residing on the table 702. Furthermore, the ARFN 102 may blur the content as it travels along the path 1002, or may otherwise alter the visual appearance in any other manner. In still other instances, the ARFN 102 may emit a sound from speakers of the ARFN 102 represent that the content is moving within the environment 800, or may represent this movement in any other way.

Example Processes

Figure 12:
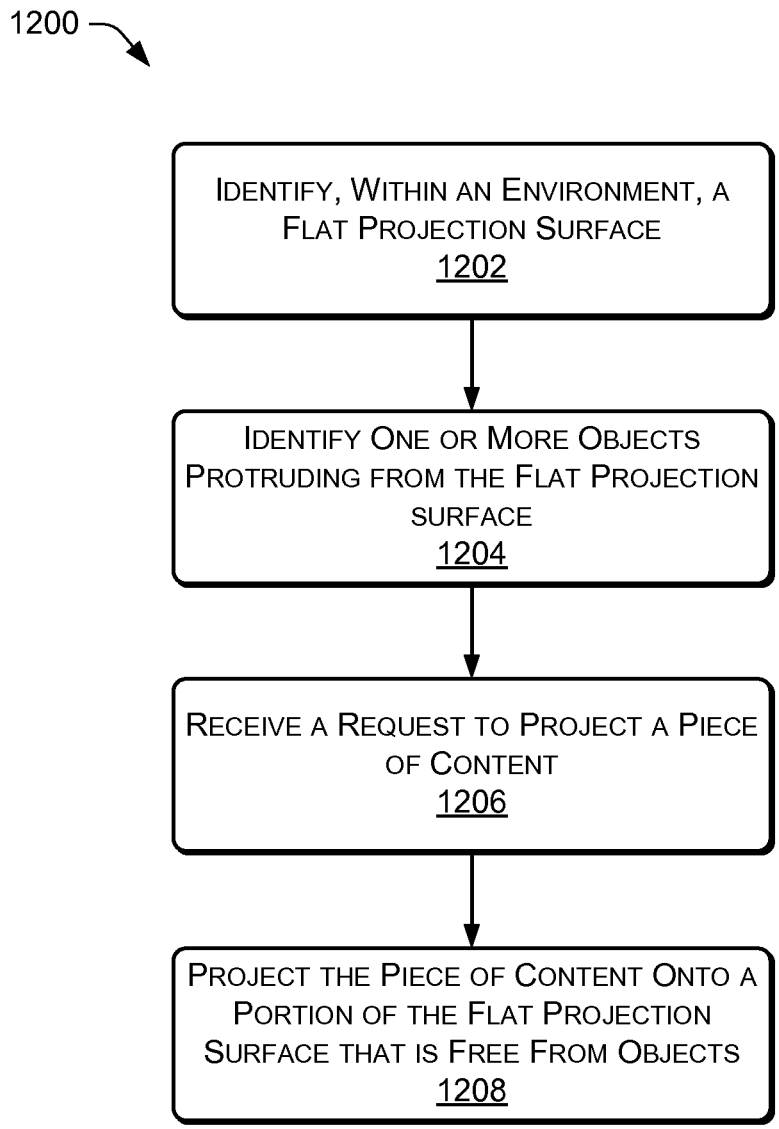
FIGS. 12-13 illustrate example processes for identifying projection areas as described below.
Figure 13:
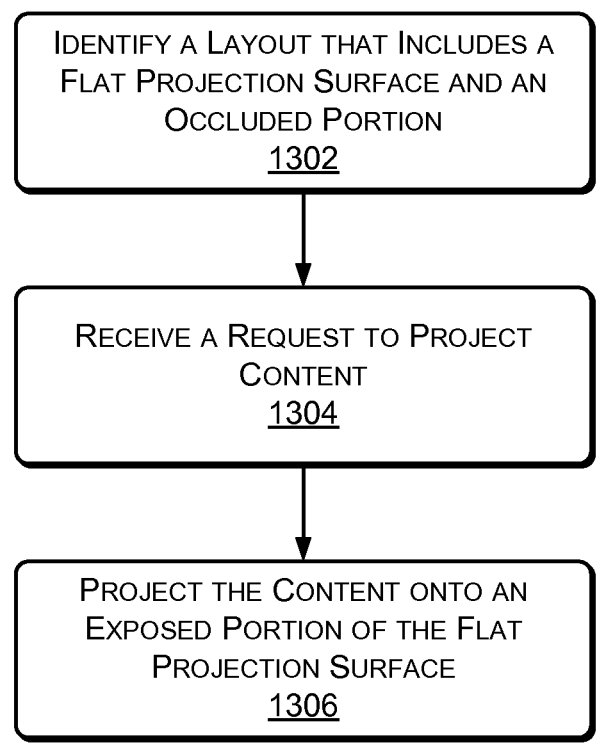

FIGS. 12-13 are example processes 1200 and 1300 for identifying projection surfaces within an environment. These processes (as well as other processes described in this disclosure) may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented within the architectures described above, as well as within other architectures.

The process 1200 includes, at 1202, identifying, within an environment, a flat projection surface for projecting content thereon. Next, at 1204, the process 1200 identifies one or more objects protruding from the flat projection surface. Both the surface and the objects may be identified by detecting depths and/or edges of objects within the environment using the techniques described above.

At 1206, the process 1200 receives a request to project a particular piece of content within the environment. This request may be received via a user gesture, a user issuing an audible command, or in any other manner. Finally, at 1208, the process 1200 projects the particular piece of content onto a portion of the flat projection surface that is free from the one or more protruding objects at least partly in response to the receiving of the request.

Next, the process 1300 includes, at 1302, identifying a layout of an environment, with the layout including at least one flat projection surface having one or more exposed portions and one or more occluded portions. Some or all of the exposed portions may be free of objects protruding from the flat projection surface, while some or all of the occluded portions may be covered with respective protruding objects. Furthermore, some of the occluded portions of the flat projection surface may be deemed as being occluded based at least in part on a field of view of a projector and/or a line of sight of a user within the environment, as discussed above with reference to FIGS. 8-9.

At 1304, the process 1300 receives a request to project content within a particular area of the environment. Finally, at 1306, the process 1300 projects the content on an exposed portion of the at least one flat projection surface within the particular area of the environment at least partly in response to the receiving of the request.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more non-transitory computer-readable media storing computer-executable instructions that, when executed by one or more processors, cause the one or more processors to perform acts comprising:
   identifying, within an environment, a projection surface for projecting content thereon;
   identifying one or more objects protruding from the projection surface;
   determining a portion of the projection surface that is free from the one or more protruding objects based on the identifying of the one or more objects protruding from the projection surface;
   receiving a request to project a particular piece of content within the environment;
   at least partly in response to the determining, altering a field of view of a projector to include the determined portion of the projection surface that is free from the one or more protruding objects; and
   at least partly in response to the receiving of the request, projecting, by the projector, the particular piece of content onto the determined portion of the projection surface that is free from the one or more protruding objects.

2. One or more non-transitory computer-readable media as recited in claim 1, wherein the identifying of the projection surface comprises:
   projecting a structured light pattern onto the projection surface; and
   measuring distortion of the structured light pattern on the projection surface.

3. One or more non-transitory computer-readable media as recited in claim 1, wherein the identifying of the one or more protruding objects comprises determining a depth of the projection surface and a depth of the one or more protruding objects.

4. One or more non-transitory computer-readable media as recited in claim 1, wherein the identifying of the one or more protruding objects comprises detecting edges of the one or more protruding objects.

5. One or more non-transitory computer-readable media as recited in claim 4, wherein the detecting of the edges comprises:
   identifying a predominant color of the projection surface; and
   identifying changes in the predominant color, at least a portion of the changes representing respective edges of the one or more protruding objects.

6. One or more non-transitory computer-readable media as recited in claim 1, wherein the identifying of the one or more protruding objects comprises comparing a first image of the environment with a second, later image of the environment.

7. One or more non-transitory computer-readable media as recited in claim 1, wherein the request is received from a user within the environment and the particular piece of content comprises a menu, the acts further comprising:
   identifying a gesture from the user selecting one or more particular icons on the menu; and
   at least partly in response to the identifying of the gesture:
   identifying a different piece of content associated with the gesture; and
   projecting the different piece of content.

8. One or more non-transitory computer-readable media as recited in claim 1, wherein the identifying of the one or more protruding objects comprises identifying at least two protruding objects, and wherein the projecting comprises projecting the particular piece of content on a portion of the projection surface that is spaced approximately between the at least two protruding objects.

9. A method comprising:
   under control of one or more computer systems configured with specific executable instructions,
   identifying a layout of an environment, the layout including at least one projection surface having one or more exposed portions and one or more occluded portions, wherein at least one of the one or more occluded portions of the at least one projection surface is at least partly covered by one or more objects that reside on, or protrude from, the at least one of the one or more occluded portions of the at least one projection surface, and wherein the identifying of the layout comprises identifying the one or more objects that reside on, or protrude from, the at least one projection surface;
   receiving a request to project content within a particular area of the environment;
   at least partly in response to the identifying, altering a field of view of a projector to include a particular exposed portion of the projection surface that is free from the one or more objects that reside on, or protrude from, the at least one projection surface; and
   at least partly in response to the receiving of the request, projecting, by the projector, the content on the particular exposed portion of the at least one projection surface within the particular area of the environment.

10. A method as recited in claim 9, wherein the identifying of the layout comprises detecting depths of objects within the environment.

11. A method as recited in claim 9, wherein the identifying of the layout comprises detecting color variations within the environment to identify objects therein.

12. A method as recited in claim 11, wherein the detected color variations within the environment identify edges of the objects within the environment.

13. A method as recited in claim 9, wherein the at least one projection surface comprises a wall, a floor, a countertop, a ceiling, a desk, or a table.

14. A method as recited in claim 9, wherein the request is received from a user making a gesture within the environment or the user audibly uttering the request within the environment.

* * * * *